July 10, 1951 H. H. MUELLER 2,559,786

INTERLOCKING PHONOGRAPH TURNTABLE COVER

Filed Feb. 6, 1947 2 Sheets-Sheet 1

Inventor

Herman H. Mueller

By Clarence A. O'Brien and Harvey B. Jacobson

Attorneys

July 10, 1951 H. H. MUELLER 2,559,786

INTERLOCKING PHONOGRAPH TURNTABLE COVER

Filed Feb. 6, 1947 2 Sheets-Sheet 2

Inventor

Herman H. Mueller

By Clarence A. O'Brien and Harvey B. Jacobson

Attorneys

Patented July 10, 1951

2,559,786

UNITED STATES PATENT OFFICE 2,559,786

INTERLOCKING PHONOGRAPH TURNTABLE COVER

Herman H. Mueller, Ephrata, Pa., assignor of one-fourth to George L. Bowman, Ephrata, one-eighth to John L. Bowman, Denver, and one-sixteenth to Stanley A. Radzay, Ephrata, Pa.

Application February 6, 1947, Serial No. 726,934

2 Claims. (Cl. 274—39)

The present invention comprises novel and useful improvements in a phonograph record disk and more specifically pertains to a construction which is particularly applicable to a phonographic record changer and player for frictionally securing in driving relation a plurality of record disks to each other and to a turntable of the instrument.

The primary purpose of this invention resides in devising a construction which may be readily attached to existing phonograph records or may advantageously be incorporated into new phonograph records for preventing contact of the sound tracks thereof when the records are stacked upon each other; and which is thereby effective to prevent accidental marring of the sound tracks when records are placed in contact with each other as during stacking, or assembly upon a record changer and player phonograph.

A most important aim of the invention resides in devising a construction wherein the record in contact with the sound needle is caused to invariably rotate at the exact speed of the turntable, and this regardless of the number of records which may be interposed therebetween.

An additional important object of the invention resides in providing a device in accordance with the foregoing object which is particularly adapted for positioning upon a record disk at the heretofore unemployed centrally apertured portion within the confines of the spiral sound tracks thereof.

Yet another very important purpose of the invention resides in providing a construction in conformity with each of the preceding objects which is capable of frictionally interlocking the adjacent surfaces of adjacent record disks to thereby prevent slippage of one disk upon another as when a plurality of disks are mounted upon the turntable of a record changer and player, and thereby prevent unnecessary wear and marring of the sound tracks thereof.

Still another very important purpose of the invention comprehends the provision of a construction in accordance with the aforesaid objects wherein the frictional clutching surfaces are so constructed as to facilitate their interlocking engagement with each other and with the turntable of the phonograph.

Additional important objects reside in providing a construction as set forth in the above mentioned objects of the invention, and which shall be inexpensive, compact, of light weight, and thoroughly dependable in its functioning.

A further object of the invention resides in providing an adaptor for the turntables of phonograph record players and changers which shall be particularly adapted to support a record or a plurality of record disks in accordance with the preceding objects, and which may be readily applied or removed from the turntable as desired.

These, together with various ancillary objects of the invention which will later become apparent as the following description proceeds, are realized by this invention, various embodiments of which have been illustrated by way of example only in the accompanying drawings, wherein.

It is well known that despite the most careful attention, the normal wear incident to playing a phonograph record by passing a sharpened needle over the sound track thereof, results in time in wearing down the sharp profiles in the sound track and thereby distorting the fidelity of reproduction of the message or sounds impressed thereon. This wear may eventually become so great as to render the record totally worthless. This condition is extremely undesirable both from the aspect of the expense of replacing the record, the necessity for repeatedly replacing a particular record, and the fact that many records, as for example personal recordings, are irreplaceable. Moreover, in addition to this normal wear, records further become deteriorated by reason of the relatively hard usage occasioned by their employment in a phonograph record player and changer. In such a machine, a stack of plurality of records is placed upon the turntable, and the top record, upon whose sound track the phonograph needle is travelling, is driven by the frictional engagement existing between the adjacent surfaces of each of the records therebelow and the upper surface of the turntable.

To aggravate the foregoing difficulty, it is well known that records of molded plastic composition frequently become slightly warped and when these are stacked, the warped surfaces including the sound tracks thereon rub upon adjacent surfaces of adjacent records, thereby additionally wearing the sound track thereon and impairing the life and efficiency of the record. Further, the occasional sliding and creeping of one record upon the adjacent surface of a contacting record frequently introduces additional attrition upon the contacting surfaces.

The fundamental purpose of this invention therefore resides in providing an attachment and construction for obviating the above mentioned difficulties, prolonging the life of a record and greatly enhancing the fidelity of its tone reproduction.

Figure 3:
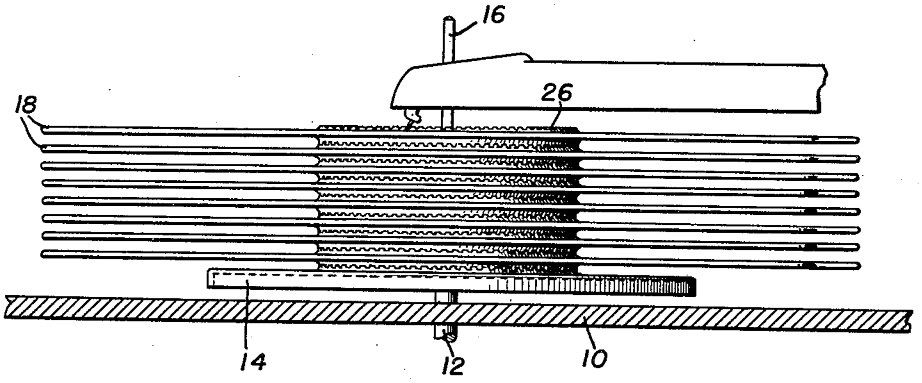
Figure 3 is a side elevational view, parts being shown in section, of a portion of a phonograph record player and changer showing the manner of applying the instant invention thereto.

Referring now more specifically to the accompanying drawings, wherein like numerals indicate similar parts throughout the various views, attention is directed first to Figure 3, which at 10 shows a portion of the casing of any conventional type of record player and changer phonograph, having the usual vertically disposed driving shaft 12 operated by any suitable means, not shown, and which upon its upper end carries the disc-like turntable 14. As shown best in Figure 9, the upper extremity of the shaft 12 is of relatively reduced diameter as indicated at 16 and is adapted to receive and position thereabout a plurality of record disks 18 by means of the customarily provided centrally disposed aperture 20 therein as shown in Figure 1.

Figure 1:
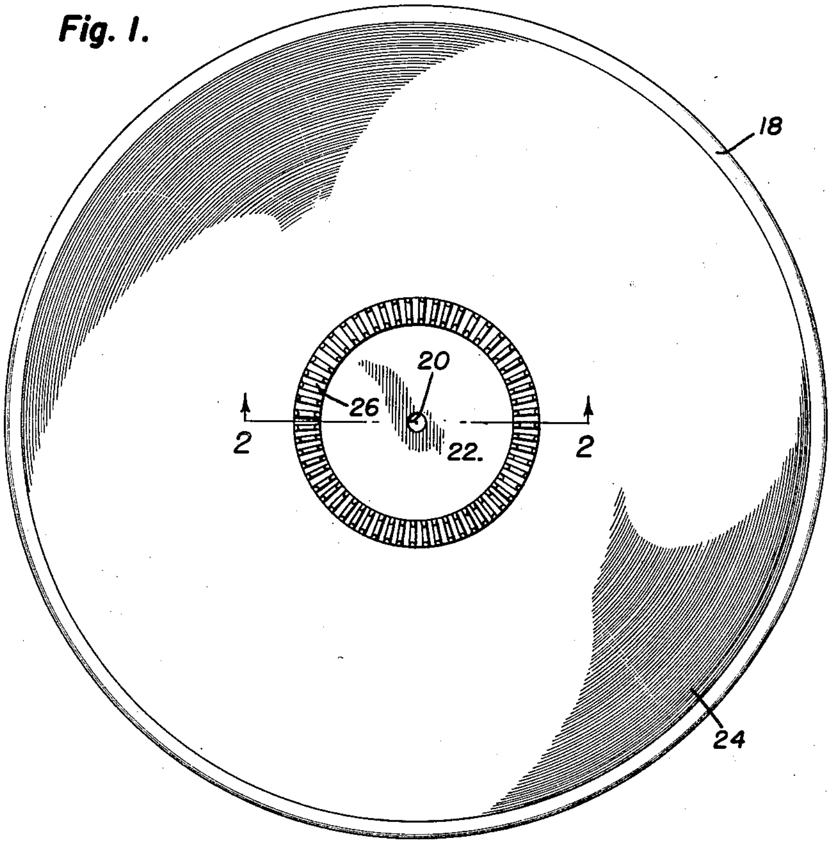
Figure 1 is a top plan view of a phonograph record disk showing the invention applied thereto.
Figure 2:
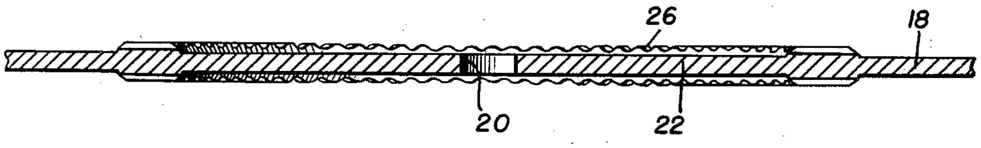
Figure 2 is an enlarged fragmentary detail view, taken substantially in vertical section upon the section line 2—2 of Figure 1.

As is well known, and shown in Figure 1, the conventional phonograph record disc is provided with a centrally apertured circular portion 22 which is surrounded by a portion 24 having the spirally disposed sound track thereon. In accordance with the dictates of this invention an annular raised surface is formed in or mounted upon the annular portion 22, in concentric position about the aperture 20. It is intended that this raised surface shall be serrated or roughened as shown at 26, and shall be elevated a small but sufficient distance above the playing surface of the portion 22, in order to effectively space the stack of superposed records disks 18 from each other a sufficient distance to prevent contact between the adjacent sound tracks, even though the disk should be slightly warped or distorted. In the embodiment shown in Figures 1, 2 and 10, the roughened elevated portions 26 are preferably annular although it will be understood that these elevations and roughened surfaces may be of any other desired shape and contour. As indicated more clearly in Figure 10, these serrations or roughened portions may be formed as a series of radially disposed ridges and grooves 26 and 28 respectively, this elevated annulus having a wavy contour as indicated in Figure 2. Preferably, the edges of the ridges 26 are beveled or inclined as at 30 and the adjacent sides of the ridges are similarly shaped.

It is regarded as an important feature of the invention that the serrations or ridges shall be radially disposed of the disks 18 and concentric of the axis of rotation which is the aperture 20, in order to facilitate the alignment of the adjacent clutch surface of the superimposed disk, and facilitate the interlocking engagement of the two adjacent clutch surfaces.

Figure 10:
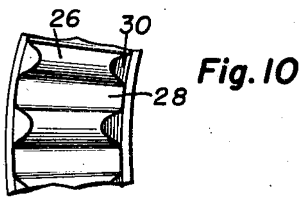
Figure 10 is a fragmentary, enlarged detail view in top plan, of the frictional engaging means of Figures 1 and 2.

It should, of course, be readily understood that the clutch surfaces are formed upon or attached to both sides of each of the disks and preferably although not necessarily should be attached to the adjacent surface of the turntable in a manner to be set forth hereinafter. In the embodiment of Figures 1, 2 and 10, it has been indicated that the elevated and roughened annulus shall be formed integrally from the composition of the record disk.

Figure 4:
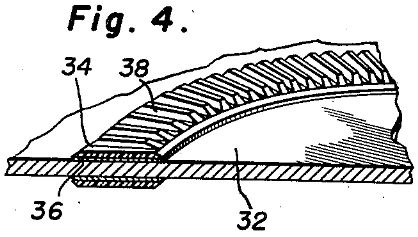
Figure 4 is a fragmentary perspective view of a portion of a phonograph record disk showing the construction of the instant invention and the manner of applying the same thereto.

As will be noted, in the foregoing embodiment the construction is primarily intended for incorporation into a new disk at the time of its manufacture. In order to apply the principles of this invention to existing record disks the adaptations shown in Figures 4 and 5 may be resorted to. In Figure 4, there has been depicted a section of the central portion of a record disk 32 upon which has been mounted an annulus 34, concentric with the axis of rotation of the disk and secured thereto as by an adhesive layer of cementitious character indicated at 36. The upper surface of the annulus 34 is roughened or serrated as at 38 in accordance with the construction of the previously set forth embodiment. As clearly shown in Figure 4, the elevated and roughened annulus is applied to both surfaces of the record disk 32. In operation, this form of the invention may be readily applied to existing phonograph records and when so applied will satisfactorily function in the same manner as the preceding construction.

Figure 5:
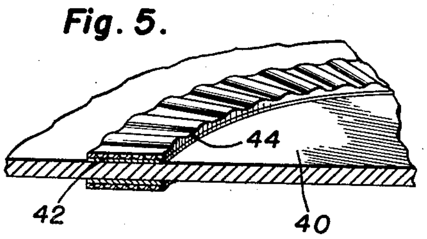
Figure 5 is a view similar to Figure 4 but showing a modified form of the invention.

In the embodiment in Figure 5, the fragmentary centrally apertured inner portion 40 of a record disk has secured thereto as by a cementitious layer 42 an annulus 44 having a crenelated or corrugated upper surface, the ridges and depressions of which are preferably disposed radially about the axis of rotation of the disk.

Figure 6:
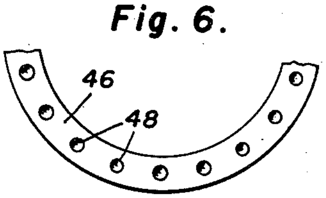
Figures 6, 7 and 8 are fragmentary top plan views showing various modified forms of clutch means in accordance with the present invention.

In the three preceding embodiments of Figures 10, 4 and 5, the clutch or frictional engaging surface of the elevated annulus has been illustrated as being of a ridge and valley nature. However, it will be readily understood that any convenient type of frictional or interlocking surfaces may be employed. Thus, as shown in Figure 6, the annulus 46 may be provided with a row or circle of alternate protuberances and recesses of a circular cross section as at 48. Obviously, the complementary adjacent annulus of the juxtaposed disk will have the projections thereon received in the recesses of the mating annulus.

Figure 7:
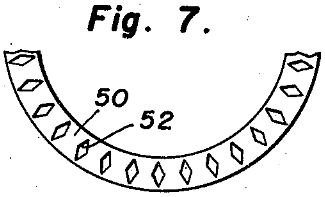

Alternatively, the annulus 50 as shown in Figure 7, may be provided with a circular series of diamond shaped alternately disposed projections and recesses which are adapted to interlock with correspondingly shaped elements of the adjacent annulus.

Figure 8:
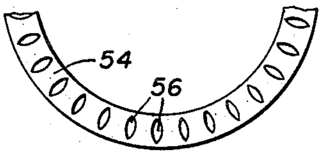

As shown in Figure 8, the annulus 54 may be provided with a circular array of leaf-shaped alternate projections and recesses 56 for the same purpose set forth in the preceding paragraphs.

Although for convenience of illustration the spacing and frictional member has been indicated as being annular in its shape, it will be obvious that it may be formed as a polygon of any desired character and instead of a ring is capable of use as a circular or other shaped area.

Moreover, although the attachment adapted for use upon existing phonograph record disks has been illustrated as being applied thereto by a cement layer, it will be readily perceived that other fastening means, such as vulcanization, if the spacing and frictional element is of a rubber nature, may be employed; and even mechanical means such as rivets, suction disks or any other known type of fastening arrangement may be utilized within the spirit of the invention.

Alternatively, in the preparation of new phonograph record disks, the spacing and frictional element may be of a metallic or hardened plastic character, which may be embedded within the material of the record disk at the time the latter is molded and given its impression for its sound track.

Figure 9:
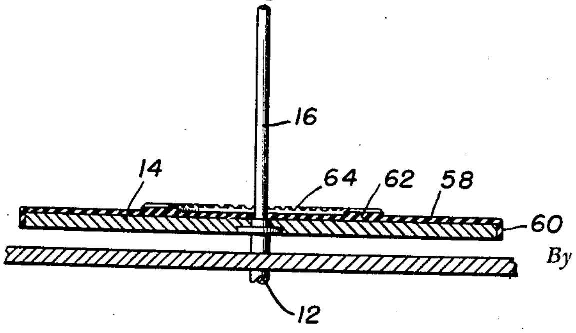
Figure 9 is a fragmentary transverse vertical sectional view through a portion of a phonograph record player and changer with the turntable and an attachment applied thereto.

In order to more completely apply the principles of the invention to existing phonograph record players and changers, the construction shown in Figure 9 and indicated in Figure 3, may advantageously be employed. The turntable 14 may have its upper surface permanently or removably covered by a cover member 58 having a peripherally and downwardly extending rim or flange 60 adapted to frictionally engage and embrace the edge of the turntable 14. One convenient construction of this cover member 58 may be formed of a rubber composition, and the rim 60 of such size and character as to be yieldingly stretched to tightly embrace the edge of the turntable 14, to firmly and tightly secure the cover thereto.

Disposed concentrically of the axis of rotation of the cover 58 and turntable 14, the upper surface of the cover is provided with an annular raised portion 62 provided with a frictional surface 64 of the same character as in any of the foregoing embodiments. It may thus be seen that when the cover member 58 has been detachably or permanently applied to the turntable 14, the elevated portion 62 with its frictional surface 64 is adapted for engagement by any of the correspondingly shaped frictional clutch elements carried by the record disks 18, whereby the rotation of the turntable may be directly applied to the central portion of the disk by means of the clutch element applied thereto.

It will thus be perceived that in such a use as depicted in Figure 3, the top disk of a series of disks 18 is directly driven from the turntable 14 by means of the series of interlocking members as aforesaid; and that the sound tracks of each of the disks are maintained out of contact with each other whereby the drive of the top disk is carried directly through the interlocking engagement of the series of clutch elements. There is thus no sliding of any disk upon its adjacent corresponding disk, thereby increasing the life of the sound tracks thereon.

Moreover, it is an essential pre-requisite to tonal fidelity of reproduction, that the sound track shall revolve at the same speed of the turntable. Any slippage, therefore, in a stack of records, will necessarily detrimentally affect the tonal characteristics of sound reproduction.

Since numerous modifications and arrangements will be readily apparent to those skilled in the art after consideration of the foregoing specification, it is not desired to limit the invention to the exact construction shown and described, but all suitable modifications and equivalents may be resorted to falling within the scope of the appended claims.

What I claim is:

1. In a phonograph record player having a turntable, a turntable cover of resilient material, a rim on said cover for frictionally embracing the rim of the turntable, said cover having a central portion adapted to smoothly and continuously lie upon the entire upper surface of the turntable, a ring positioned upon and rising above said cover upon the central portion thereof for engaging the central portion of a record disk inside the sound track thereof.

2. The combination of claim 1 wherein said ring has an interlocking surface constituted by alternate elevated and depressed elements for engaging a record disk.

HERMAN H. MUELLER.

REFERENCES CITED

The following references are of record in the file of this patent:

UNITED STATES PATENTS

| Number | Name | Date |
|---|---|---|
| 741,247 | Johnson | Oct. 13, 1903 |
| 1,163,566 | Scotford | Dec. 7, 1915 |
| 1,288,610 | Jones | Dec. 24, 1918 |
| 1,360,900 | Davis | Nov. 30, 1920 |
| 1,446,289 | Dessau | Feb. 20, 1923 |
| 1,480,629 | Nolen | Jan. 15, 1924 |
| 1,675,852 | Geer | July 3, 1928 |
| 1,804,453 | Basseches | May 12, 1931 |
| 2,291,538 | Ebert | July 28, 1942 |

FOREIGN PATENTS

| Number | Name | Date |
|---|---|---|
| 5,682 of 1910 | Great Britain | Mar. 2, 1911 |
| 180,078 | Great Britain | May 24, 1922 |
| 228,005 | Great Britain | Jan. 29, 1925 |
| 469,666 | Germany | Dec. 19, 1928 |
| 124,508 | Austria | Sept. 25, 1931 |
| 63,231 | Denmark | Mar. 5, 1945 |